United States Patent [19]

Valyi

[11] Patent Number: 4,701,292
[45] Date of Patent: Oct. 20, 1987

[54] METHOD FOR PRESSURE MOLDING OBJECTS OF DIFFERENT RESINS

[75] Inventor: Emery I. Valyi, Stamford, Conn.

[73] Assignee: Husky Injection Molding Systems Ltd., Bolton, Canada

[21] Appl. No.: 650,041

[22] Filed: Sep. 13, 1984

[51] Int. Cl.$^4$ .............................................. B29C 45/16
[52] U.S. Cl. ..................................... 264/255; 264/39; 264/328.8; 425/130
[58] Field of Search ............... 264/255, 294, 328.8, 264/39, 45.1, 245, 513; 425/132, 567, 573, DIG. 224, 130

[56] References Cited

U.S. PATENT DOCUMENTS

| | | | |
|---|---|---|---|
| 3,339,240 | 9/1967 | Corbett | 425/567 |
| 3,599,290 | 8/1971 | Garner | 425/130 X |
| 3,690,797 | 9/1972 | Garner | 425/130 X |
| 3,888,612 | 6/1975 | Schrewe et al. | 425/130 |
| 4,052,497 | 10/1977 | Monnet | 264/328.8 |

FOREIGN PATENT DOCUMENTS

| | | | |
|---|---|---|---|
| 1382291 | 11/1964 | France | 425/132 |
| 45-2990 | 10/1965 | Japan | 264/328.8 |
| 56-106839 | 8/1981 | Japan | 425/130 |

*Primary Examiner*—James Lowe
*Attorney, Agent, or Firm*—Bachman & LaPointe

[57] ABSTRACT

The method and device of the present invention include an injection mold, an injection nozzle communicating with said injection mold via a single injection channel, a first feeding means for feeding a first resin to said nozzle and injection mold, a second feeding means for feeding a predetermined amount of a second resin to said nozzle and injection mold operative to leave second resin in said nozzle, and means to remove out of said nozzle the second resin left therein.

7 Claims, 4 Drawing Figures

METHOD FOR PRESSURE MOLDING OBJECTS OF DIFFERENT RESINS

BACKGROUND OF THE INVENTION

The present invention relates to the art of pressure molding objects of at least two different resins.

Pressure molding, particularly injection molding, of articles simultaneously made of two different resins is known and described in the literature. In that process several, but for parctical reasons usually only two, separate injection units are employed to supply molten plastic to a single gate, i.e. injection orifice, leading into a mold cavity. The plastics emerging from the two injection units are usually different. For example, one may be a solid resin while the other may contain a foaming agent and thus become porous in the mold; or, one may be a structurally superior material while the other may have the better barrier characteristics. Through appropriate valving one resin is injected into the mold cavity, whereby the volume so injected is less than sufficient to fill the mold cavity. Thus, this first plastic entering the mold cavity will not fill the same completely while advancing along the mold cavity walls which are chilled as usual. A chilled skin is thereby formed in contact with the mold cavity walls. Immediately following this step, the supply of this first resin is interrupted and the second resin is injected within the skin that has formed in contact with the mold wall. Alternately, the injection of the second resin is started and thereafter continued without interrupting the injection of the first resin. The supply of the second resin is continued until the cavity is completely filled by action of resin B and/or a foaming agent contained therein. When applied to the combination of a solid and a foamed resin, this process produces articles that have a solid, smooth, structurally resistant skin, filled with a porous material, resulting in strong and durable articles with low total plastic content and accordingly relatively low in coat. Examples of this molding technique are found extensively in the manufacture of furniture, instrument housings, automotive dash boards and other commonly used objects.

Another application, although less frequently encountered, is the combination of two resins, both solid: in other words, the "inner resin" does not contain a foaming agent. The purpose is to impart to the outer layer improved abrasion resistance or some other property which is desirable to have on the outside, and which is obtainable by the use of a relatively expensive resin; this is then followed by the injection of a less expensive resin which need not have the properties of the first one and is accordingly less costly.

In order to fill the mold cavity in the sequence indicated, it is necessary to provide suitable nozzles through which the sequential injection can be perfected. As an example, U.S. Pat. No. 4,376,625 shows a nozzle in which the first material enters through a central passage and second through an annular passage concentric with the first and in which a shuttle valve provides communication with the mold cavity, once for the first material and then for the second one as well. Such a procedure, however, is inconvenient and expensive, subject to breakdowns and inoperative when applied to multi-cavity molds.

A particular objective of the present invention is to extend the technique of multiple injection to multi-cavity molds without having to resort to complicated and wasteful cold runners. It was found to be impossible heretofore to apply the multiple injection technique to multi-cavity molds under employment of gating and molten plastic distribution principles that have proven to represent the most economical injection molding practice. This fact kept the multiple injection technique from being used for comparatively small objects, as for example, packages and containers which, in order to be molded economically, must be produced in multi-impression molds, the number of impressions often reaching 40 or more.

The device used in normal pressure molding practice for multi-impression molds is known as the hot runner, or insulated runner in which a heated manifold is used to distribute hot molten plastic from one injection source through a network of channels and through individual nozzles into each cavity of the multi-impression mold set. The hot runner, or insulated runner technique, is widely used. Reference can be made for example to U.S. Pat. Nos. 4,268,240, 4,213,751 and 4,333,629. All of these patents describe hot runners in which a temperature controlled manifold, usually contained within a plate, communicates with nozzles by way of suitable passages which in turn communicate with the mold cavity.

It is an objective of the present invention to render possible the use of a hot runner (or insulated runner) manifold distribution system for multi-component pressure molding. Problems stood in the way of accomplishing this objective heretofore. For example, clearly, upon completion of any given molding operation and before the molded part is removed from the injection mold, the hot runner manifold system including the nozzles contains stagnant resin which has last been injected. This resin residing in the manifold system would be the one to enter the mold cavity in the course of the subsequent shot while a like amount of resin would be furnished by the injection unit recharging the manifold system. The attempt to use a hot runner manifold system for multi-component injection has been impossible because the hot runner and the nozzles would remain charged, i.e. prefilled with the last injected resin so that upon opening communication between the manifold and the mold cavity the next time, that resin would be the first one to enter the mold, while in fact just the opposite should be accomplished. Accordingly, if a known and conventional hot runner system were to be used for multi-component injection, each first molded part would have one resin on the outside and the other on the inside while each next molded part would have the opposite sequence of layers, an obviously intolerable condition.

It is, therefore, a principal object of the present invention to develop a method and device for pressure molding objects of at least two different resins which method and device is convenient and expeditious to employ and which may be readily used on a commercial scale.

It is a further object of the present invention to provide a method and device as aforesaid which overcomes the disadvantages noted heretofore.

Further objects and advantages of the present invention will appear hereinbelow.

SUMMARY OF THE INVENTION

In accordance with the present invention it has now been found that the foregoing objects and advantages may be readily obtained. The method of the present invention is a method for pressure molding objects of at least two different resins which comprises: providing an injection mold comprising a mold cavity; providing an injection nozzle having a single injection channel communicating with said injection mold; providing a source for a first resin and a source for a second resin communicating with said injection nozzle as via a manifold: first feeding said first resin to said injection mold via said nozzle; discontinuing said first feeding after a predetermined quantity of said first resin has been discharged into said mold from said first source in an amount less than the capacity of said mold, leaving a portion of said first resin in said nozzle; second feeding said second resin to said injection mold via said nozzle, thereby forcing the quantity of first resin residing in the nozzle to pass into said injection mold; discontinuing said second feeding after a predetermined quantity of said second resin has been discharged from said second source, thereby leaving a portion of said second resin in said nozzle; and third feeding sufficient first resin in said nozzle as via said manifold to force the second resin in said nozzle out of said nozzle into said injection mold or alternately away from said mold. The injection nozzle may have a closeable communication with the injection mold and the closeable communication may be closed at the completion of the second or third feeding. An overflow means may be provided, communicating with the nozzle and the step of third feeding then forces the second resin in the nozzle out of the nozzle and into the overflow means. Generally, each source is provided with separate manifolds.

The device of the present invention is a device for pressure molding objects of at least two different resins which comprises: an injection mold; an injection nozzle communicating with said injection mold via a single injection channel; first feeding means for feeding a first resin to said nozzle and injection mold operative to feed a first resin to said injection mold in an amount less than the capacity of said mold; second feeding means for feeding a predetermined amount of a second resin to said nozzle and injection mold operative to leave second resin in said nozzle: and means to remove second resin out of said nozzle into said injection mold or away from it, if preferred. The injection nozzle may have a closeable communication with the injection mold. The device may include overflow means communicating with the injection nozzle for holding the excess second resin removed from said nozzle. Generally separate manifolds are provided for each feeding means.

It is a particular advantage of the present invention that the system is purged of resin after each shot and before the next following shot is admitted into the mold cavities in a simple, convenient and expeditious manner. Particularly, the nozzles are purged and, if so desired, the manifold system as well. In other words, in accordance with the present invention it is possible to eliminate one plastic from at least the nozzles before the second plastic is injected which as indicated heretofore is a considerable advantage. This is obtained in one of two ways, either by purging the entire manifold system or by purging only the nozzles. If the latter, which is preferable, the manifold system is subdivided into one network of channels through which nothing but one component resin flows and a second channel network through which only a second resin flows. The two resin streams enter the mold cavity through the same nozzle and it is therefore necessary to purge that nozzle between two molding cycles.

As an alternative a single manifold system may be used; however, this is not as convenient since it necessitates purging the entire manifold system between two molding cycles.

BRIEF DESCRIPTION OF THE DRAWINGS

The present invention will be more readily understood from a consideration of the drawings in which.

DETAILED DESCRIPTION

Figure 2:
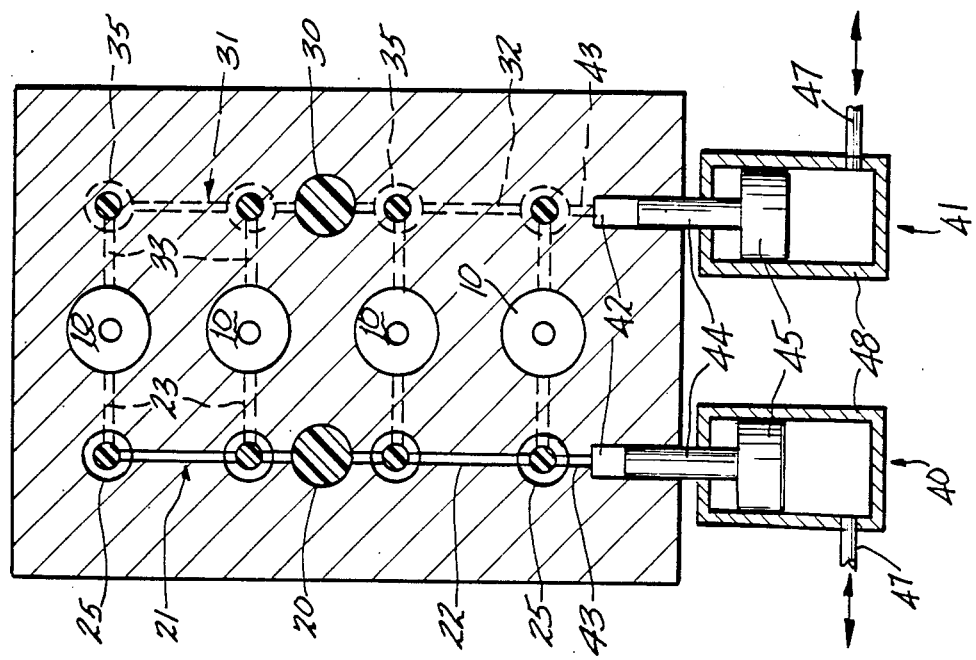
FIG. 2 is a schematic top view of an arrangement showing separate manifolds leading to a plurality of injection nozzles and including an overflow means.
Figure 1:
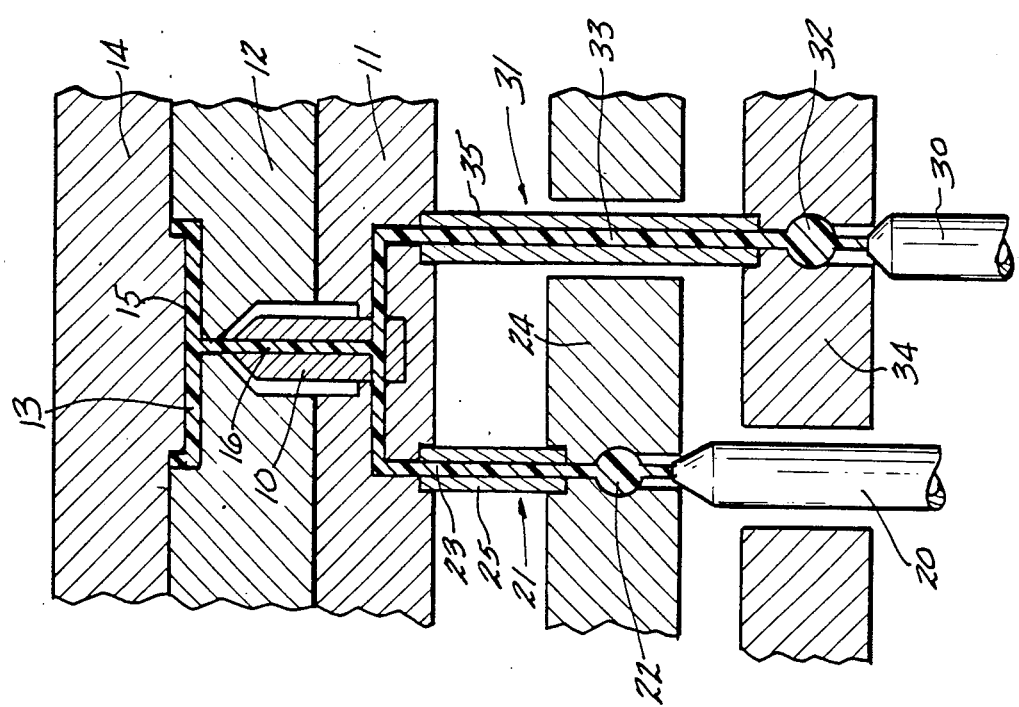
FIG. 1 is a schematic view of a preferred arrangement showing separate manifolds leading to a single injection nozzle.

Referring to FIG. 1, a preferred arrangement according to the present invention is shown therein, schematically showing the injection and distribution system suitable for purging the nozzles. Nozzles 10 (one being shown) are held in support plate 11 and communicate with injection mold cavities 13 within mold support plates 12 and 14 through injection gates or orifices 15 each via a single injection channel 16. It is shown in FIG. 2 that the arrangement may use a plurality of such nozzles. Conventionally, plate 12 is a stationary mold plate and plate 14 is a moveable mold plate, separable for the removal of the molded article from mold cavity 13.

First feeding means is provided by first extruder 20 spaced from nozzles 10 and communicating with channel 16 via first manifold system 21 for feeding a first hot, flowable resin, or resin A, to nozzle 10 and from nozzle 10 to the injection mold cavity 13. First extruder 20 may be provided with valve means (not shown) for discontinuing the flow of resin A. Manifold system 21 consists of a first network portion 22 which serves a plurality of nozzles as shown in FIG. 2 and a first channel portion 23 extending from network 22 to nozzle 10. As shown in FIG. 1, network portion 22 is arranged in first manifold plate 24 and channel portion 23 is arranged in nozzle support plate 11 with first connecting tube 25 running from manifold network portion 22 to channel portion 23. Naturally, it should be understood that the foregoing is simply an illustrative embodiment and many other variations may be employed, for example, instead of using a multiplicity of plates it is possible to employ a single plate and to machine passages therein corresponding to manifold system 21. In some instances, of course, the geometric arrangement of the mold cavities and the nozzles renders the use of a single plate uneconomical or even impossible.

Second feeding means is provided by second extruder 30 spaced from nozzle 10 and communicating with channel 16 via second manifold system 31 for feeding another hot, flowable second resin or resin B, to nozzle 10 and from nozzle 10 to injection mold cavity 13. Second extruder 30 may be provided with valve means (not shown) for discontinuing the flow of resin B. Manifold system 31 consists of a second network portion 32 which may serve a plurality of nozzles as shown in FIG. 2 and a second channel portion 33 extending from network 32 to nozzle 10. As shown in FIG. 1 network portion 32 is arranged in second manifold plate 34 and channel portion 33 is arranged in nozzle support plate 11 with second connecting tube 35 running from manifold network 32 to channel 33. Here again it should be understood that the foregoing is simply illustrative and many variations may be employed as for example those described in connection with the first manifold system. Also, although separate manifold plates are shown for the first and second network portions, it should be understood that a single manifold plate can be used, if the two network portions may be operated at temperatures that are comparatively close to each other.

FIG. 2 shows the system of FIG. 1 utilizing four (4) nozzles 10 served by a first extruder 20 for resin A and a second extruder 30 for resin B. First manifold system 21 is shown in opposed relationship to second manifold system 31, with first channel portion 23 and second channel portion 33 reaching nozzles 10 from opposite sides. It should naturally be understood that the intersects of these channels with nozzles 10 need not be diametrically opposed as long as they are separated from each other. For example, one of the two channels may be axially aligned with nozzle 10 and/or concentric therewith while the other channel is at an angle thereto. Communication between these several channel networks may be established by means of connecting tubes 25 and 35, respectively, as shown in FIGS. 1 and 2, whereby one set of tubes, namely tubes 35, must of course reach plate 34 through appropriate clearances in plate 24. It is of course to be appreciated, as pointed out hereinabove, that the representation in FIGS. 1 and 2 is purely schematic and many variations are possible some of which are pointed out heretofore.

In operation, referring to FIG. 1, a predetermined quantity of resin A is fed by first extruder 20 to injection mold cavity 13 via first network portion 22, channel portion 23 and channel 16 in nozzle 10. At the completion of the above feeding with resin A, the first network portion 22, channel portion 23 and nozzle channel 16 are filled with hot, flowable resin A; however, mold cavity 13 is not. A predetermined quantity of resin B is then fed from second extruder 30 to second network portion 32 and to channel portion 33. As resin B enters nozzle channel 16 it first pushes resin A from nozzle channel 16 into the injection mold cavity 13 since mold cavity 13 is not filled and there is insufficient resistance to flow therein. As the injection of resin B is continued mold cavity 13 is filled (by action of resin B and/or a foaming agent contained therein) and thereafter further injection of resin B into mold cavity 13 is not possible. In order to clear nozzle channel 16 of resin B so that the next cycle can start with resin A, resin A is extruded from extruder 20 into nozzle channel 16 which thereby forces the resin B in nozzle channel 16 to return to channel 33, network 32 and extruder 30, see FIG. 3 which shows the nozzle on an enlarged scale. Other variations will be discussed hereinbelow.

Naturally, if nozzle 10 is not provided with a closeable communication with the injection mold as will be discussed hereinbelow, the mold cavity 13 must be kept closed and the molded article cannot be removed therefrom until resin B is purged from nozzle 10. This is usually acceptable because the cooling time of the molded part in the mold cavity tends to be long enough to carry out the above purging step. If however, a closeable communication is provided, said communication can be closed, the injection mold may be opened without delay and the molded part promptly removed.

Referring to FIG. 2, separate overflow means 40 and 41 are shown communicating with the first and second manifold systems, respectively. In accordance with the construction shown in FIG. 2, each overflow means has a space 42 communicating with the respective manifold system via channel 43. Space 42 may be a cylindrical cavity in which a displacement member or plunger 44 operates with a tight fit. Displacement plunger 44 in turn is attached to piston 45 housed in cylinder 48. In operation, the excess resin B from all nozzles at the end of the injection cycle is forced into space 42 of overflow means 41. If the injection nozzle is closed at the completion of injection of resin A, as can be done in accordance with means to be discussed hereinbelow, excess resin A, can be forced into its corresponding space 42 in overflow means 40 at the completion of injection of resin A. Thus, the strokes of displacement pistons 44, which are adjustable by conventional means, are set so as to correspond to the desired net volume which is created within space 42, namely the one equal to the combined volumes of all nozzles used in the system. Accordingly, once pressure is exerted, say for example, in second network 32, while injection nozzle 20 is closed and the communication between nozzles 10 and mold cavities 13 are closed, the resin last residing in nozzle channels 16 will be displaced by the resin entering through second network 32 and will be forced to enter space 42 of first overflow means 40. At the time of the next function of first network 22, cylinder 48 will be pressurized through channel 47 and the piston 44 forced forward to cause the resin occupying space 42 to reenter network 22 and travel towards the nozzles in combination with freshly entering plastic from the injection unit 20. Naturally, instead of a single overflow system for each resin, two or more may be interposed at several points along the respective networks. Alternatively, such overflow means may be applied at appropriate locations in communication with first and/or second channel portions 23 and 33.

Figure 3:
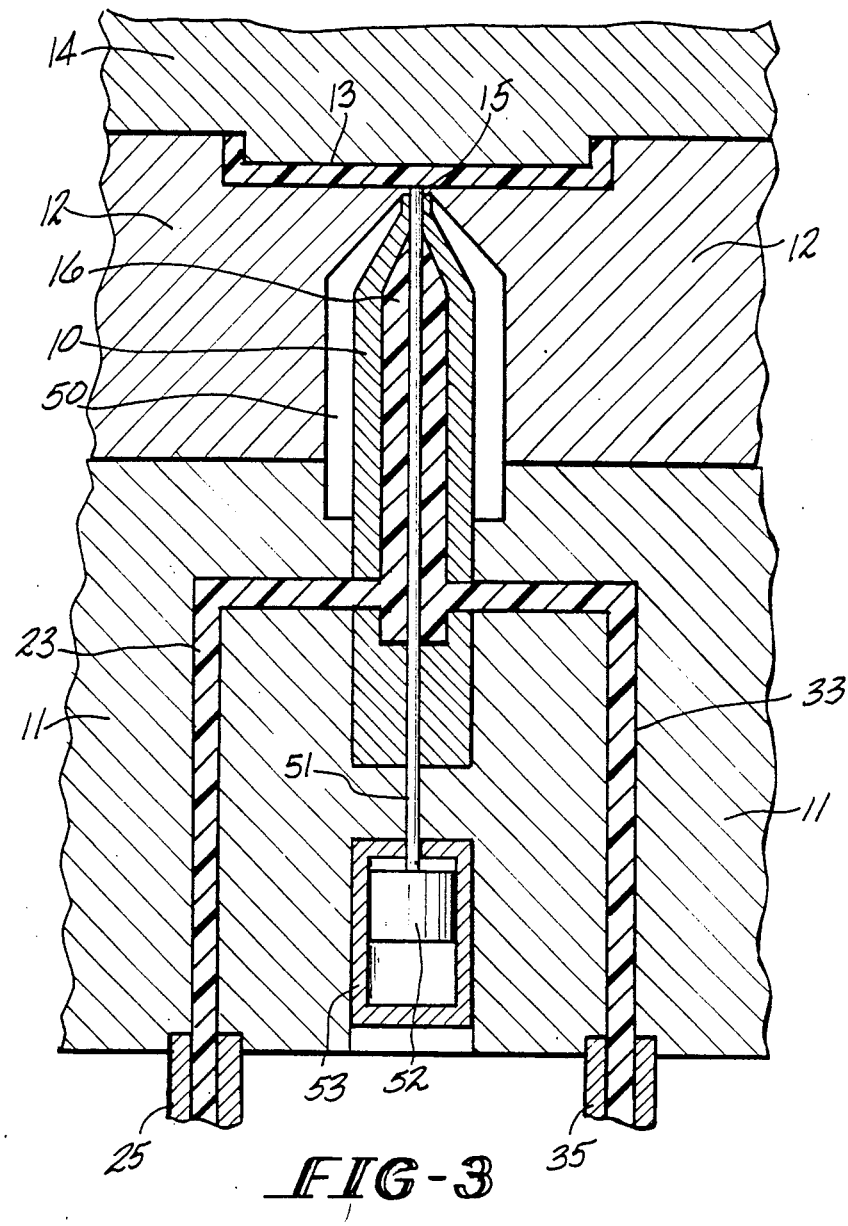
FIG. 3 is an enlarged schematic view similar to FIG. 1 showing a variation and also including a closeable communication between said nozzle and injection mold.

FIG. 3 shows schematically a single nozzle enlarged to reveal the individual operating components thereof. Nozzle 10 containing channel 16 is housed within space 50 in mold plate 12 communicating with mold cavity 13 through injection gate 15. Nozzle channel 16 communicates with supply channels 23 and 33 through which resin A and B respectively may be fed to the nozzle from their corresponding manifold networks 22 and 32, see FIGS. 1 and 2. Space 50 is provided to keep the nozzle body from contacting plate 12 because the nozzle body has to be kept at a sufficiently elevated temperature to assure flowability of the plastic while plate 12 has to be chilled to cool the freshly injected component within injection mold 13. Nozzle 10 is assembled into plate 11 as shown. Usually the nozzle 10 includes a shut off needle or valve pin 51 which provides a closeable communication with the injection mold and which is capable of acting as a valve to interrupt the flow of plastic into mold cavity 13. As shown in FIG. 3, valve pin 51 is actuated by piston 52 operating in cylinder 53 under influence of fluid pressure from a conventional source, not shown. In the position shown in FIG. 3, valve pin 51 interrupts communication between channel 16 and mold cavity 13 and opens communication once piston 52 is caused to travel downward upon reversal of fluid flow. While a vertical arrangement is shown, it should be appreciated that the apparatus is operative in any other attitude as well.

Figure 4:
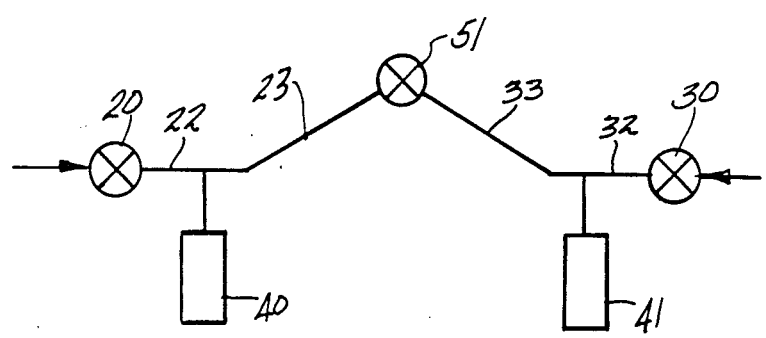
FIG. 4 is a schematic view showing the valving.

As schematically indicated in FIG. 4, the combined manifold system may be in effect controlled by two (2) or three (3) valves and, if preferred, aided by two pressurized overflows. The valves are: the shut-off valves which are conventionally part of injection units 20 and 30; and, if desired, the valve pin 51. Channels 23 and 33 may communicate with their overflows 40 and 41, if used.

Thus, the operation in accordance with the embodiment of FIG. 3 is as follows: A first resin A is made to flow through first network 22 and channel 23 reaching nozzle channel 16. With valve pin 51 in an open position resin A enters mold cavity 13 and fills a certain predetermined volume thereof. The flow of resin A is now interrupted and the flow of resin B initiated through second network 32 and channel 33 reaching the same nozzle channel 16. Since the first network 22, channel 23 and nozzle channel 16 are full at this time with resin A and the resin contained therein may be further entrapped by closing the shut-off valve of injection unit 20, resin B will enter mold 13 through nozzle channel 16 forcing the amount of resin A in nozzle channel 16 to enter mold cavity 13 in the manner described above. Once mold 13 has been completely filled, valve pin 51 is closed shutting off communication between nozzle channel 16 and mold cavity 13. With the needle valve 51 closed, resin A is now caused to flow through first network 22 and channel 23, preferably while the shut-off valve of the injection unit is closed. Resin A now entering through first network 22 and channel 23 will of course displace the residual resin B within nozzle channel 16 which has been left in it after having entered from second network 32 and channel 33. This displacement can take place either by pushing that residual resin B back towards the injection unit 30 or, if used, into pressurized overflow 41, provided that injection unit 30 is closed by its shut-off valve. If no pressurized overflow is employed, care must be taken to close the shut-off valve of injection unit 30 as soon as that amount of plastic which corresponds to the volume capacity of nozzle space 16 will have been purged from the said space, so as to avoid the plastic from first network 22 and channel 23 entering into an unwanted part of second channel 33 or even worse, into second network 32.

It is thus seen that sequential injection of two (or more) plastics can be effected by the use of a single injection nozzle for each cavity of a multi-impression mold, due to the possibility of individually purging the nozzles and of subdividing the input from the two or more injection pressure sources (injection units) through divided and individual manifold channel networks.

It is noted that the valve pin 51 may be omitted and the purging of the nozzle nevertheless effected, provided that the mold cavity remains closed with the molded part remaining therein during the purging operation. In such a cycle, there is no other escape for the to-be-purged plastic than back into its originating manifold network, if necessary aided by the corresponding overflow well. The advantage of using a needle valve is as usual to enable the part molded in the mold cavity to be removed, i.e. the mold to be opened on its own cycle, independently of the cycling of the injection units, and also to minimize the residual gate on the molded part. In the alternative calling for the purging of the entire manifold channel-network, rather than of the nozzles only, a single manifold is used and supplied from the two injection units. However, the purging of the entire manifold is advantageous only if the volume of resin contained therein is comparatively small which is usually not the case when large multi-impression molds are used. By contrast the amount of resin within nozzle space 16, i.e., the amount to be purged therefrom, is but a small fraction of the resin within mold cavity 13. It is accordingly preferable particularly in the case of large molds to employ separate manifold networks for resins A and B, thus limiting purging to nozzle space 16.

To further aid the purging operation one may apply suction to the manifold containing the resin that is being purged, resin A, for example, while the other resin, resin B, is being pressurized and made to enter the nozzle at the outset of the purging step. One of two (or both) of the following procedures can be used to accomplish this purpose;

the shut-off valve of the injection unit processing resin A is opened and the injection ram or ram-screw normally contained in that unit is pulled back so as to create a vacuum against the manifold channels while resin B enters the nozzles, or the entire manifold, as the case may be; and for the same purpose, if used, the piston of the pressurized overflow device may be retracted from space 42 before, but at least while purging takes place, thereby creating a vacuum in said space and thus against the manifold channels.

It should be noted that the amount of resin contained within nozzle space 16, i.e. the amount to be purged, is a small fraction of the total required to make a container.

A favored purging procedure is best described by identifying the individual steps thereof, as follows:

Step 1: Feed resin A to mold cavity 13 through channel 23 and nozzle space 16, until mold cavity 13 contains a predetermined amount of resin A.

Step 2: Discontinue feeding resin A, as by closing the valve of extruder 20, and feed resin B through channel 33 and nozzle space 16 thereby displacing into mold cavity 13 the amount of resin A that remained in nozzle space 16 due to Step 1; and continue feeding resin B until the mold cavity 13 is filled, except for an amount of resin corresponding to the content of nozzle channel 16.

Step 3: Discontinue feeding resin B, as by closing the valve of extruder 30 and feed resin A through channel 23 to displace into mold cavity 13 the amount of resin B that remained in nozzle space 16 due to Step 2 and discontinue feeding resin A, whereby mold cavity 13 is completely filled.

Step 4: Feed neither resin until the content of mold cavity 13 is removed and the mold re-clamped for the next operating cycle which is then initiated in accordance with Step 1 above.

If a valve pin 51 is employed, it is in the opened position, i.e. allowing resin to flow into mold cavity 13, during all of the above Steps, except during Step 4.

It is noted that initiation of the feeding of hot and flowable resins A and B and discontinuation thereof is affected by applying pressure in the respective extruders 20 and 30 in the known manner, and/or by the operation of their respective valves. Such control of extruder pressure and of valve operations may be obtained by the use of conventional fluid/electric devices, arranged to provide the sequence of operations demanded by Steps 1 through 4, whereby these devices may be pressure and/or volume responsive. Accordingly, the last operation of each step may be arranged to initiate the first operation of the next step without pause. If desired, the pressure on one resin may be diminished while the other resin is being fed by applying pressure thereto. Alternatively, pressure application to one resin may be initiated by diminution of pressure on the other.

The sequence provided by Steps 1 thorugh 4 is paraticularly advantageous if controlled as above because an uninterrupted flow under pressure of the resin is thereby obtained which is important if certain defects in the molded articles are to be avoided, such as for example surface depression and blemishes usually caused by insufficient pressure in the mold cavity, while the article is cooling therein.

To avoid the inner resin B breaking through the outer resin A during filling of the mold, it is known to be advantageous at times to continue feeding resin A at a predetermined rate while resin B is also fed into the mold, for example when the quantities of the two resins desired in the finished article and their respective viscosities differ greatly. For such instances, the procedures described permit simultaneous feeding in Step 2 instead of discontinuing feeding of resin A, by corresponding setting of the described controls.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for pressure molding objects of at least two different resins in an injection molding cycle which comprises: providing an injection mold comprising a mold cavity; providing an injection nozzle having a single injection channel substantially throughout the extent thereof communicating with said injection mold; providing overflow means communicating with said nozzle; providing a source for a hot and flowable first resin and a source for a hot and flowable second resin communicating with said injection nozzle and with said single injection channel; first feeding said first resin under pressure from its source to said injection mold via a first manifold and via said nozzle and said single injection channel; discontinuing said first feeding after a predetermined quantity of said first resin has been discharged into said mold from said first source in an amount less than the capacity of said mold, leaving a portion of said first resin in said nozzle; second feeding said second resin under pressure from its source to said injection mold via a second manifold and via nozzle and said single injection channel, thereby forcing the quantity of first resin residing in said nozzle to pass into said injection mold; discontinuing said second feeding after a predetermined quantity of said second resin has been discharged from said second source, thereby leaving a portion of said second resin in said nozzle; third feeding sufficient first resin under pressure from its source to said nozzle to force the second resin in the nozzle out of said nozzle before commencing the next cycle, and including the step of feeding said first resin via said first manifold to force the second resin in said nozzle out of said nozzle and into said overflow means wherein the feeding steps cause only one material at a time to flow through said single injection channel cross section towards said injection mold, and wherein the pressure on one resin is diminished while the other resin is being fed by applying pressure thereto, with pressure application to one resin initiated by diminution of pressure on the other.

2. The method according to claim 1 wherein the third feeding forces the second resin in said nozzle out of the nozzle and away from the injection mold.

3. The method according to claim 1 wherein the third feeding forces the second resin in said nozzle into said injection mold.

4. The method according to claim 1 wherein the injection nozzle has a closeable communication with the injection mold and including the step of closing said closeable communication at the completion of said second feeding.

5. The method according to claim 1 wherein the injection nozzle has a closeable communication with the injection mold and including the step of closing said closeable communication at the completion of said third feeding.

6. The method according to claim 1 including the step of feeding said resins to a plurality of injection mold cavities via a plurality of nozzles.

7. The method according to claim 1 wherein resin flow into the mold cavity is uninterrupted.

* * * * *